United States Patent
Zhang et al.

(10) Patent No.: US 11,647,506 B2
(45) Date of Patent: *May 9, 2023

(54) SYSTEM AND METHOD FOR BEAM INFORMATION AND CSI REPORT

(71) Applicant: Apple Inc., Cupertino, CA (US)

(72) Inventors: Yushu Zhang, Beijing (CN); Yuan Zhu, Beijing (CN); Wenting Chang, Beijing (CN); Sungho Moon, San Jose, CA (US); Bishwarup Mondal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,146

(22) Filed: Jun. 17, 2022

(65) Prior Publication Data
US 2022/0330237 A1 Oct. 13, 2022

Related U.S. Application Data

(63) Continuation of application No. 16/934,663, filed on Jul. 21, 2020, now Pat. No. 11,395,274, which is a
(Continued)

(51) Int. Cl.
*H04W 72/04* (2009.01)
*H04B 17/318* (2015.01)
(Continued)

(52) U.S. Cl.
CPC ...... *H04W 72/0413* (2013.01); *H04B 7/0417* (2013.01); *H04B 7/0695* (2013.01);
(Continued)

(58) Field of Classification Search
CPC .... H04B 17/24; H04B 17/318; H04B 7/0417; H04B 7/0456; H04B 7/0626; H04B 7/063;
(Continued)

(56) References Cited

U.S. PATENT DOCUMENTS

| | | | | |
|---|---|---|---|---|
| 2012/0300641 | A1* | 11/2012 | Chen | H04L 1/0026 370/241 |
| 2013/0102345 | A1* | 4/2013 | Jung | H04W 48/20 455/513 |
| 2014/0211731 | A1* | 7/2014 | Inoue | H04W 16/28 370/329 |

(Continued)

FOREIGN PATENT DOCUMENTS

| | | |
|---|---|---|
| WO | 2017142581 A1 | 8/2017 |
| WO | WO-2017142581 A1 * | 8/2017 ........... H04L 1/0027 |

OTHER PUBLICATIONS

Nokia Networks, "Beam index Feedback and CSI process configuration" R1-154516, 3GPPTSG RAN WG1 Meeting #82, Aug. 15, 2015, See section 4, 5.
Qualcomm Inc., "Beam formed CSI-RS Design for CSI reporting Class B" R1-157053, 3GPP TSG RAN WG1 Meeting #83, Nov. 7, 2015, See section 2.
International Search Report and Written Opinion dated Nov. 24, 2016, on application No. PCT/US2016/040162.
(Continued)

*Primary Examiner* — Rina C Pancholi
(74) *Attorney, Agent, or Firm* — Kowert, Hood, Munyon, Rankin & Goetzel, P.C.

(57) ABSTRACT

An apparatus of a user equipment (UE) may include a memory and one or more processors operatively coupled to the memory. The processors may process a scheduling trigger to provide channel state information (CSI) and beam information using extra-large physical uplink shared channel (xPUSCH). The processing device may also generate a reporting message comprising CSI and beam information. The processing device may then encode xPUSCH data to include the reporting message.

20 Claims, 6 Drawing Sheets

Related U.S. Application Data continuation of application No. 16/076,666, filed as application No. PCT/US2016/040162 on Jun. 29, 2016, now Pat. No. 10,750,483.

(60) Provisional application No. 62/299,947, filed on Feb. 25, 2016.

(51) Int. Cl.
| | | |
|---|---|---|
| *H04B 7/06* | (2006.01) | |
| *H04W 36/00* | (2009.01) | |
| *H04B 7/0417* | (2017.01) | |
| *H04L 5/00* | (2006.01) | |
| *H04W 72/12* | (2023.01) | |
| *H04B 17/24* | (2015.01) | |
| *H04B 7/0456* | (2017.01) | |

(52) U.S. Cl.
CPC ......... *H04B 17/318* (2015.01); *H04L 5/0051* (2013.01); *H04W 36/0058* (2018.08); *H04W 72/1231* (2013.01); *H04B 7/0456* (2013.01); *H04B 7/063* (2013.01); *H04B 7/0626* (2013.01); *H04B 17/24* (2015.01)

(58) Field of Classification Search
CPC ............ H04B 7/0695; H04W 36/0058; H04W 72/0413; H04W 72/1231; H04L 5/0051
See application file for complete search history.

(56) References Cited

U.S. PATENT DOCUMENTS

| | | | | |
|---|---|---|---|---|
| 2014/0328266 | A1* | 11/2014 | Yu | H04B 7/0617 370/329 |
| 2015/0162966 | A1* | 6/2015 | Kim | H04L 5/0057 370/252 |
| 2015/0341092 | A1* | 11/2015 | Park | H04B 7/0617 370/329 |
| 2015/0351135 | A1* | 12/2015 | Schmidt | H04W 52/38 455/450 |
| 2016/0007261 | A1* | 1/2016 | Oh | H04B 7/0695 455/438 |
| 2016/0353424 | A1* | 12/2016 | Stirling-Gallacher | H04B 7/0626 |
| 2017/0026938 | A1* | 1/2017 | Onggosanusi | H04L 5/0053 |
| 2017/0041880 | A1* | 2/2017 | Ouchi | H04L 5/0053 |
| 2017/0195998 | A1* | 7/2017 | Zhang | H04L 5/0057 |
| 2017/0207843 | A1* | 7/2017 | Jung | H04B 7/0695 |
| 2017/0346534 | A1* | 11/2017 | Islam | H04B 7/0417 |
| 2018/0092129 | A1* | 3/2018 | Guo | H04W 56/0005 |
| 2018/0262250 | A1* | 9/2018 | Kim | H04B 17/309 |
| 2018/0262251 | A1* | 9/2018 | Kim | H04B 7/0626 |
| 2019/0045494 | A1* | 2/2019 | Ho | H04W 72/042 |

OTHER PUBLICATIONS

Catt "Beam selection indicator or PUSCH for CSI reporting class B" R1-155216, 3GPP TSR RAN WG1 Meeting #82bis, Sep. 25, 2015 See section 2.1-2.3.
CSI feedback for beamformed CSI-RS on PUSCH CATT 3GPP TSG RAN WG1 Meeting# 82, R1-153946 Aug. 2015 (Year: 2015).

\* cited by examiner

| | |
|---|---|
| OCT 1 | BRS Index |

| | | |
|---|---|---|
| OCT 2 | BRS Index | BRS-RP |

| | | | | |
|---|---|---|---|---|
| OCT 3 | BRS-RP | SF | B | Reserved |

FIG. 5

SYSTEM AND METHOD FOR BEAM INFORMATION AND CSI REPORT

RELATED APPLICATIONS

This application is a continuation of U.S. patent application Ser. No. 16/934,663, filed Jul. 21, 2020, now U.S. Pat. No. 11,395,274, issued Jul. 19, 2022, which is a continuation of U.S. patent application Ser. No. 16/076,666, filed Aug. 8, 2018, now U.S. Pat. No. 10,750,483, issued Aug. 18, 2020, which is the National Stage Entry of PCT Application No. PCT/US2016/040162, filed Jun. 29, 2016, and which claims the benefit of U.S. Provisional Patent Application No. 62/299,947, filed Feb. 25, 2016, each of which is hereby incorporated by reference herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

BACKGROUND

The disclosure relates to the field of wireless communications, including reporting of channel information by user equipment.

BRIEF DESCRIPTION OF THE DRAWINGS

Various embodiments of the present disclosure will be understood more fully from the detailed description given below and from the accompanying drawings of various embodiments of the disclosure.

FIG. 5 illustrates an example reporting element, according to an embodiment.

DESCRIPTION OF EMBODIMENTS

Figure 1:
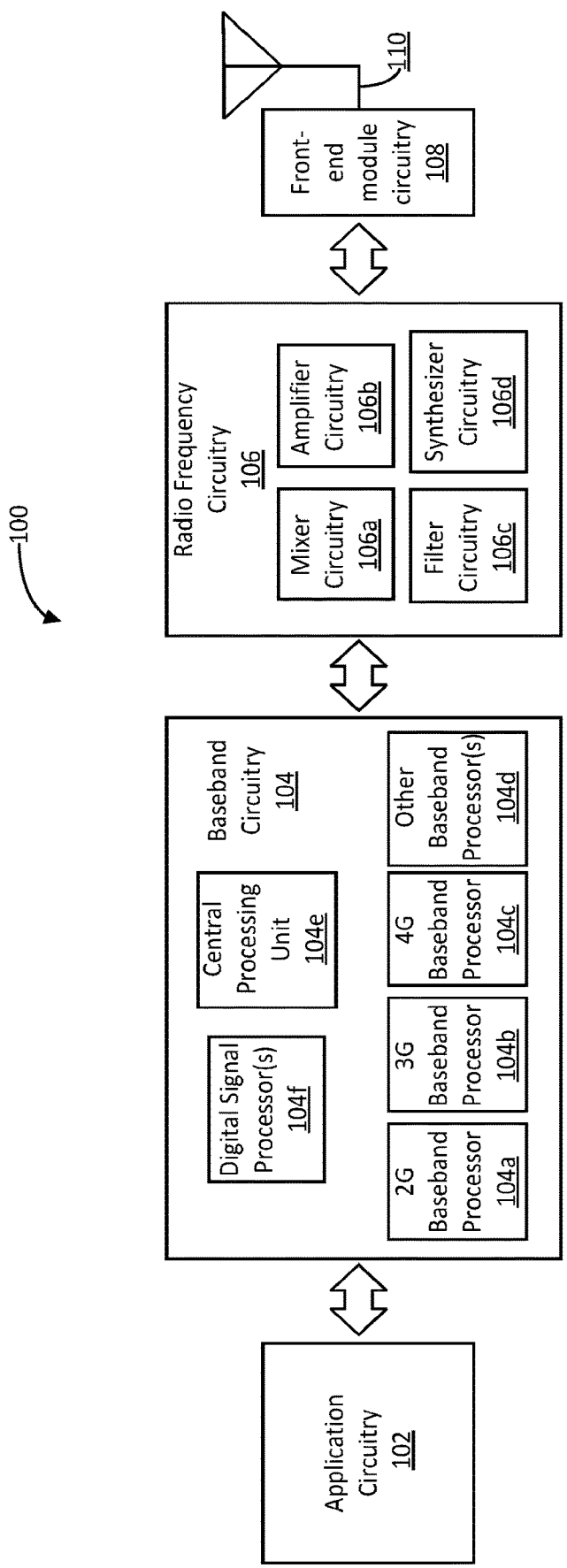
FIG. 1 is a block diagram illustrating components of an electronic device implementing aspects of the disclosure, according to an embodiment.

User equipment (UE) connected to a wireless network may report information to the network regarding the quality of communications received. For example, the UE may report back information that indicates the strength of a signal transmit from a base station. The information reported may be used by the base station to determine how to send information to the UE or to determine if a UE should be handed over to another base station. In long term evolution (LTE) systems, a UE may communicate with the network using one or more channels, carriers, or beams. In order to determine operating parameters for one or more UEs, the network may therefore benefit from additional channel state information. In order to efficiently transmit the channel state information to the network, the UE may transmit a reporting message over an extra-large physical uplink shared channel (xPUSCH).

UEs connected to the network using multiple input and multiple output (MIMO) connections may report information regarding various channels used by the UE. In a MIMO system, the UE and the base station may each use multiple antennas to transmit and receive signals. The signals may then be received through several different channels. For example, in some embodiments a UE and a base station may each use 2 antennas for transmitting and receiving signals. In such a system, there are 4 channels through which the data may be transmit (e.g., from the first antenna of the transmitter to the first antenna of the receiver, from the first antenna of the transmitter to the second antenna of the receiver, from the second antenna of the transmitter to the first antenna of the receiver, or from the second antenna of the transmitter to the second antenna of the receiver). The UE may measure the quality of signals received through each of these channels.

In some embodiments, a base station may utilize multiple antennas to for beams to produce stronger signals to UEs connected to the network. For example, MIMO antenna systems forming beams may be applied in a 5G system to enhance the coverage and improve the spectrum efficiency. For example, a base station of the network in a MIMO system, such as an evolved nodeB (eNodeB), may maintain a number of Transmitting (Tx) and Receiving (Rx) beams. In order to coordinate the beams to provide various UEs with appropriate signals, the UE may need to report Channel State Information (CSI) as well as beam information to the network. For example, the UE may report a channel quality indicator (CQI) that indicates the quality of transmissions received by the UE. The eNodeB may use this feedback information to determine a modulation scheme to use when sending transmissions to the UE. The beam information provided as feedback from the UE may contain the Tx beam index (BI) and the Beam Reference Signal Receiving Power (BRS-RP). In some embodiments, a UE may report more than one BRS-RPs in order to support flexible beamforming and dual beam operation. For example, reporting multiple beams may indicate which beam to use to communicate with the UE, how to use multiple beams to communicate with the UE, or who to direct a beam to target the UE.

In some embodiments, the UE may provide feedback comprising one or more of CSI, channel quality indicator (CQI), a precoding matrix indicator (PMI), corresponding rank index (RI), and beam index (BI). The channel quality indicator may indicate the modulation and coding schemes used by the UE. The CQI may be based on a PMI and RI for the UE. In some embodiments, the CQI may be an integer value that indicates the quality of the channel. In response to receiving the CQI, the network may send transmissions at a higher coding rate and with different modulation schemes. The PMI indicates which precoding matrix should be used by the network for communications. The PMI may be based on the RI, and may be selected from a codebook based on the RI. The codebook may be a stored set of PMI that is used by the UE and the network to determine coding and modulation schemes for transmissions. For example, a codebook may store precoding information in a lookup table that is used by the UE and an eNodeB when sending transmissions. The RI may indicate a number of layers that the UE is using during decoding of downlink transmission. The BI may indicate a particular number of layers for the beam on which the UE is reporting.

The UE may report 5G Uplink Control Information (xUCI) including CSI and BRS-RP reports using an associated 5G physical uplink shared channel (xPUSCH) in response to an uplink grant received from the eNodeB. For example, in some embodiments, the eNodeB may provide an uplink grant to the UE that indicates which information to provide to the network. For example, the eNodeB may instruct the UE to report the beam information by explicitly triggering the BRS-RP report in an uplink grant. For example, a scheduling trigger in an uplink grant may include a control element that acts as a BRS-RP report indicator. In some embodiments, the eNodeB may include a BRS-RP report indicator in the uplink grant that indicates whether the UE is to report beam information. For example, a BRS-RP report indicator with a first value may indicate the BRS-RP report using xPUSCH is enabled and a BRS-RP report indicator with a second value may indicate that BRS-RP reporting is not enabled. If BRS-RP is not enabled, the UE may report feedback information including CSI without BRS-RP reporting.

Figure 2:
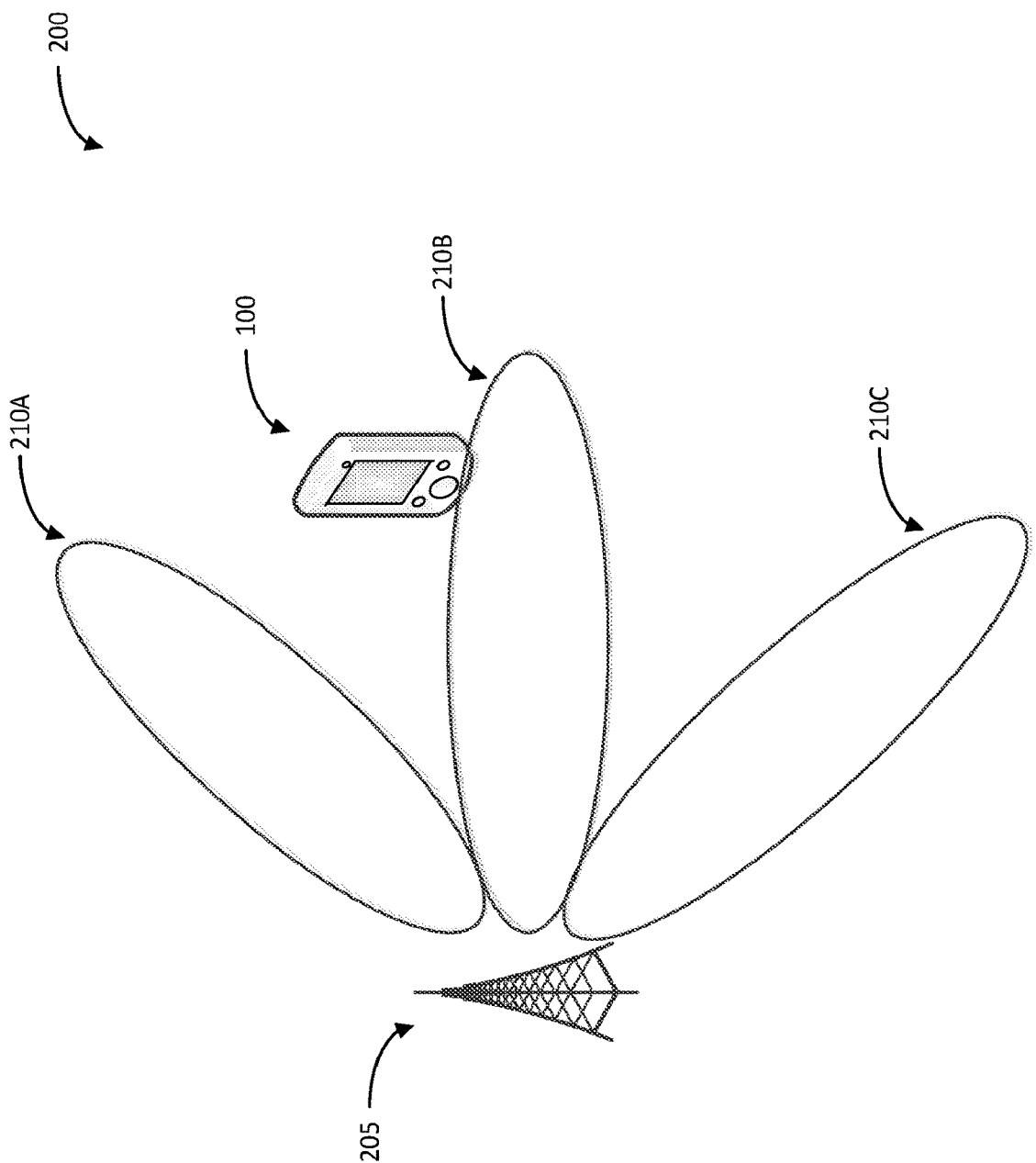
FIG. 2 is a block diagram illustrating components of a network, according to an embodiment.

In some embodiments, the UE may report the BRS-RP as a MAC control element (CE). The BRS-RP information may be transmit to the network using use a particular logic channel ID (LCID) to indicate the MAC CE for BRS-RP reporting. An example for the MAC CE for BRS-RP reporting is depicted in FIG. 2. The MAC CE may include an indication of the BRS-RP, the sub-frame index in which the BRS-RP is measured, and the beam on which the BRS-RP is measured. In some embodiments, the UE may report multiple BRS-RPs. For example, the BRS-RPs may be measured for more than one beam or more than one sub-frame for a particular beam. In some embodiments, the multiple BRS-RPs are may be reported to the network as individual MAC CEs in a single MAC protocol data unit (MAC PDU).

In some embodiments, the BRS-RP may be reported in a message associated with CSI for the UE. For example, the BRS-RP or other beam information may be transmitted to the network along with CSI information. In some embodiments, the UE may transmit one or more BRS-RPs to the network with CSI in a particular sub-frame based on pre-defined system information. For example, the UE may be configured by the uplink grant or higher layer signaling to report one or more BRS-RPs to the network. In some embodiments, the channel coding scheme for the BRS-RPs and the CQI may be the same.

In some embodiments, the UE may report CSI using xPUSCH sub-frame n upon decoding an uplink grant in that sub-frame that includes an indication to report CQI in the xUCI scheduled for uplink transmission to the network. The CSI report may be associated with one CSI-RS processes for the UE. In some embodiments, the network may not request more than one CSI report for a given sub-frame. In some embodiments, the UE may be semi-statically configured by higher layers to feedback CQI and precoding matrix indicator (PMI) and corresponding rank index (RI) and beam index (BI) on the same xPUSCH by the setting of reporting modes by the network. For example, the network may set the UE to report CQI and PMI based on the modes defined in Table 1 below.

TABLE 1

| | | PMI Feedback Type | | |
|---|---|---|---|---|
| | | No PMI | Single PMI | Multiple PMI |
| PUSCH CQI Feedback type | Wideband CQI | Mode 1-0 | Mode 1-1 | |
| | UE Selected (sub-band CQI) | | | |
| | Higher Layer-Configured (sub-band CQI) | Mode 3-0 | Mode 3-1 | Mode 3-2 |

During reporting operations, the UE may select one or more beams and report one or more associated BIs. The number of beams reported may be determined based on the associated CSI process. The modes described in Table 1 may determine the feedback provided by the UE. As shown in the table, the UE may operate to report in three types of xPUSCH CQI feedback: wideband CQI. UE selected sub-band CQI, or higher layer configured sub-band CQI. The UE may also provide three types of PMI feedback: no PMI, single PMI, or multiple PMI.

In wideband CQI the UE may operate in mode 1-0 or mode 1-1. In mode 1-0 a UE reports a wideband CQI value which is calculated assuming transmission on set S sub-bands. Furthermore, the reported CQI values are calculated conditioned on the reported RI. In mode 1-1, a single precoding matrix is selected from the codebook assuming transmission on set S sub-bands. A UE shall report a wideband CQI value which is calculated assuming the use of the single precoding matrix in all sub-bands. The UE shall report the selected single precoding matrix indicator.

In higher layer configured sub-band CQI, the UE may operate in one of modes 3-0, 3-1, or 3-2. In mode 3-0, the UE may report a wideband CQI value that is calculated assuming transmission on a set S of sub-bands. The UE may also report one sub-band CQI value for each sub-band in set S. The sub-band CQI value may be calculated assuming transmission only in the sub-band. The report CQI values may be calculated conditioned on the reported RI.

In mode 3-1 the UE may select a single precoding matric from the codebook assuming transmission only in a set S of sub-bands. The UE may also report one sub-band CQI value for each sub-band in the set S, which are calculated assuming the use of the single precoding matrix in all sub-bands and assuming transmission in the corresponding sub-band. The UE may also report a wideband CQI value which is calculated assuming the use of the single precoding matrix in all sub-hands and transmission on the set S of sub-bands. The UE may report the selected single precoding matrix indicator with the report.

In mode 3-2 the UE may select a preferred precoding matrix from the codebook assuming transmission only in the selected sub-band. The UE may report may include one wideband CQI value per codeword. The wideband CQI value may be calculated based on CQI of a set of sub-bands. For example, assuming the use of the corresponding selected precoding matrix in each sub-band and transmission on the set of sub-bands, the UE may calculate the wideband CQI value based on sub-band CQI values. The UE may report the selected single precoding matrix indicator for each sub-band in the set of sub-bands. In some embodiments, the UE report may also include one sub-band CQI value for each sub-band of the set of sub-bands reflecting transmission over the single sub-band and using the selected precoding matrix in the corresponding sub-band. The reported PMI and CQI values may be calculated based on the reported RI.

In reporting CQI values for wideband and respective sub-bands, the UE may encode the sub-band CQI using a 2 bit sub-band differential CQI offset level. The offset level may be set as the sub-band CQI index minus the wideband CQI index. An example mapping from the differential CQI value to the offset level may be given by table 2 below. In some embodiments, the mapping may be set differently.

TABLE 2

| Sub-band differential CQI value | Offset level |
|---|---|
| 00 | 0 |
| 01 | 1 |
| 10 | $\geq 2$ |
| 11 | $\leq -1$ |

The sub-band size supported for various wideband bandwidths may be given according to the table below. Accordingly, the UE or network may determine which mode of reporting to use for the UE based on the sub-band size supported. The system bandwidth listed in the table may is listed according to the number of downlink resource blocks available. In some embodiments other sizes of sub-bands may be supported or other bandwidths may be available to the system.

TABLE 3

| System Bandwidth | Sub-band Size (k) |
|---|---|
| 6-7 | NA |
| 8-10 | 4 |
| 11-26 | 4 |
| 27-63 | 6 |
| 64-110 | 8 |

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the disclosure. However, various aspects of the disclosed embodiments may be practiced in other examples that depart from these specific details. In certain instances, descriptions of well-known devices, circuits, and methods are omitted so as not to obscure the description of the present disclosure with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a UE device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry may generate reports of CSI to transmit to the network as instructed. For example, the baseband circuitry may generate a report including BRS-RP, CSI, CQI, RI, BI, or other information regarding the quality of communications for a channel or beam associated with the UE. Such a report may be encoded by the baseband circuitry and provided through RF circuitry for transmission to the network over xPUSCH. In some embodiments, the baseband circuitry may also process signals received from the network to determine how to report channel or beam information to the network. For example, the baseband circuitry may process signals instructing the UE which information to include in a report based on a mode provided by the network.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. For example, in some embodiments, the baseband circuitry may encode a MAC CE with BRS-RP information and CSI information for reporting to an associated eNodeB. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110).

In some embodiments, the UE device 100 may include additional elements such as, for example, memory/storage, display, camera, sensor, and/or input/output (I/O) interface.

FIG. 2 illustrates an example network environment 200 according to an embodiment. The network environment 200 may include a UE 100 as described above with reference to FIG. 1. The UE 100 may communicate with a network through an eNodeB 205. As shown in FIG. 2, the eNodeB 205 may communicate with one or more beams 210A-210C. The beams may be formed by the eNodeB 205 in order to improve transmission power to UEs connected to the network. The eNodeB 205 may form the beams using multiple antennas in a MIMO system. In order to produce a beam in a particular direction, the eNodeB 205 may delay transmission to one antenna of a pair of antennas. The delay may cause the signals produced by the pair of antenna to constructively interfere in one direction, and destructively interfere in other directions. In some embodiments, there may be multiple pairs of antennas to produce beams in different directions. The different beams may then be used to spatially multiplex signals transmit by the base station to different UEs. For instance, some UEs may connect to the network through beam 210A, while others may connect through beam 210B or 210C.

In order to provide feedback on the strength of signals received by UE 100 that is communicating with eNodeB 205, the UE may transmit one or more indications of the quality of signals received. For example, the UE may provide an indication of the strength of the signal received from one or more beams provided by the network. Accordingly, the UE 100 may measure the strength of signals received from the eNodeB 205, as well as measuring other indications of quality such as signal to noise ratio.

Based on the CSI received from the UE 100, the eNodeB 205 may modify the modulation and coding schemes used to communicate with the UE 100. For example, if the UE 100 reports high quality channel information, the eNodeB 205 may transmit downlink information to the UE 100 with more efficient encoding and modulation. On the other hand, if the UE reports low quality channel information, the eNodeB 205 may transmit downlink information with slower encoding and modulation, but in a manner that improves the error rate for the communications.

Figure 3:
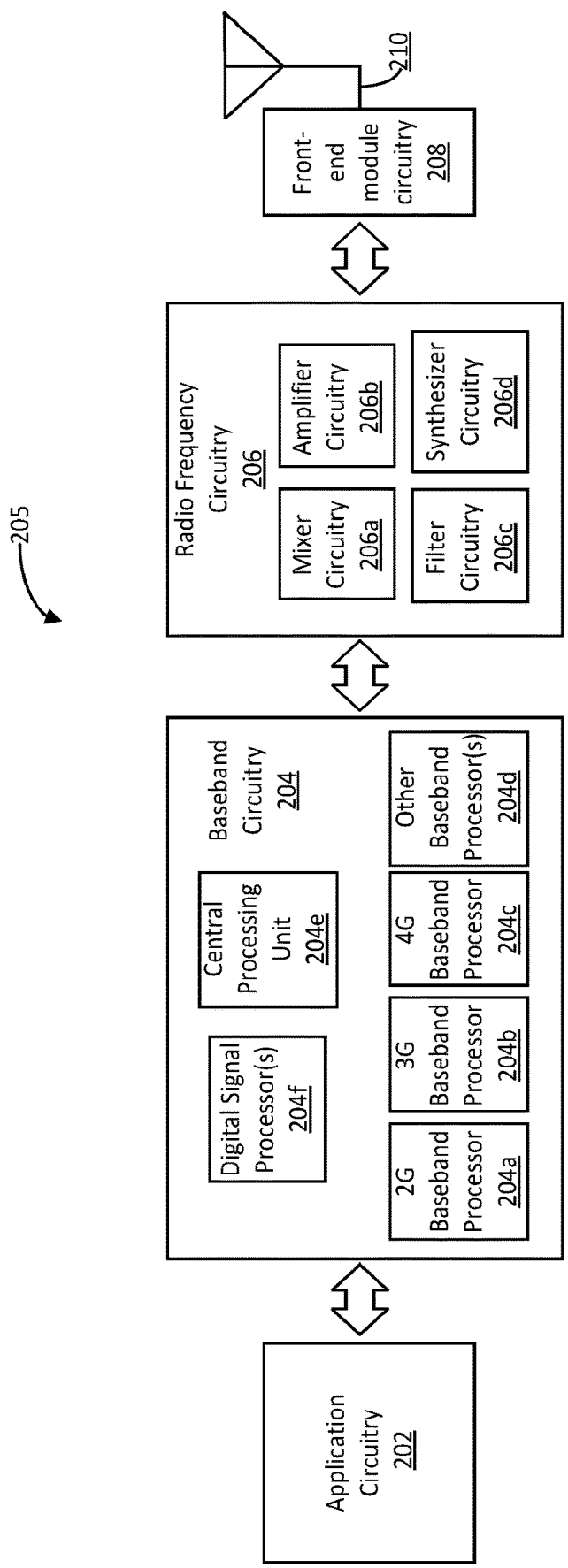
FIG. 3 is a block diagram illustrating components of an electronic device implementing aspects of the disclosure, according to an embodiment.

FIG. 3 illustrates, for one embodiment, example components of an eNodeB 205. For example, the eNodeB illustrated in FIG. 3 may be the same or similar to the eNodeB 205 depicted in FIG. 2. In some embodiments, the eNodeB 205 may include application circuitry 202, baseband circuitry 204, Radio Frequency (RF) circuitry 206, front-end module (FEM) circuitry 208 and one or more antennas 210, coupled together at least as shown. The components of eNodeB 205 may perform operations similar to those of corresponding component of UE 100 discussed above. For example, baseband circuitry 204 of eNodeB 205 may perform operations similar to those of baseband circuitry 104 of UE 100.

The components of eNodeB 205 may also perform additional or different operations compared to those of UE 100 to enable the eNodeB 205 to request and process beam information and CSI reports received from the UE. For example, the antennas 210 of the eNodeB 205 may generate one or more beams for downlink transmissions to one or more UEs as discussed above with reference to FIG. 2. The baseband circuitry 204 of the eNodeB may modulate a random access response to provide an uplink grant to a UE. The uplink grant may indicate to the UE beam information and CSI to report to the eNodeB 205. The baseband circuitry 204 may also process beam information and CSI reported from one or more UEs. For example, the baseband circuitry 204 may decode xPUSCH received at the eNodeB 205 from one or more UEs. Furthermore, based on the received CSI and beam information, the baseband circuitry 204 may update the coding and modulation schemes at the base station based on the CSI and beam information. For example, if a UE reports an increasing strength of the BRS-RP, the eNodeB 205 may use a coding or modulation scheme that provides increased downlink transmission speeds. The coding and modulation schemes may be set by the baseband circuitry 204 based on coding and modulation schemes stored in the memory associated with the baseband circuitry.

Figure 4:
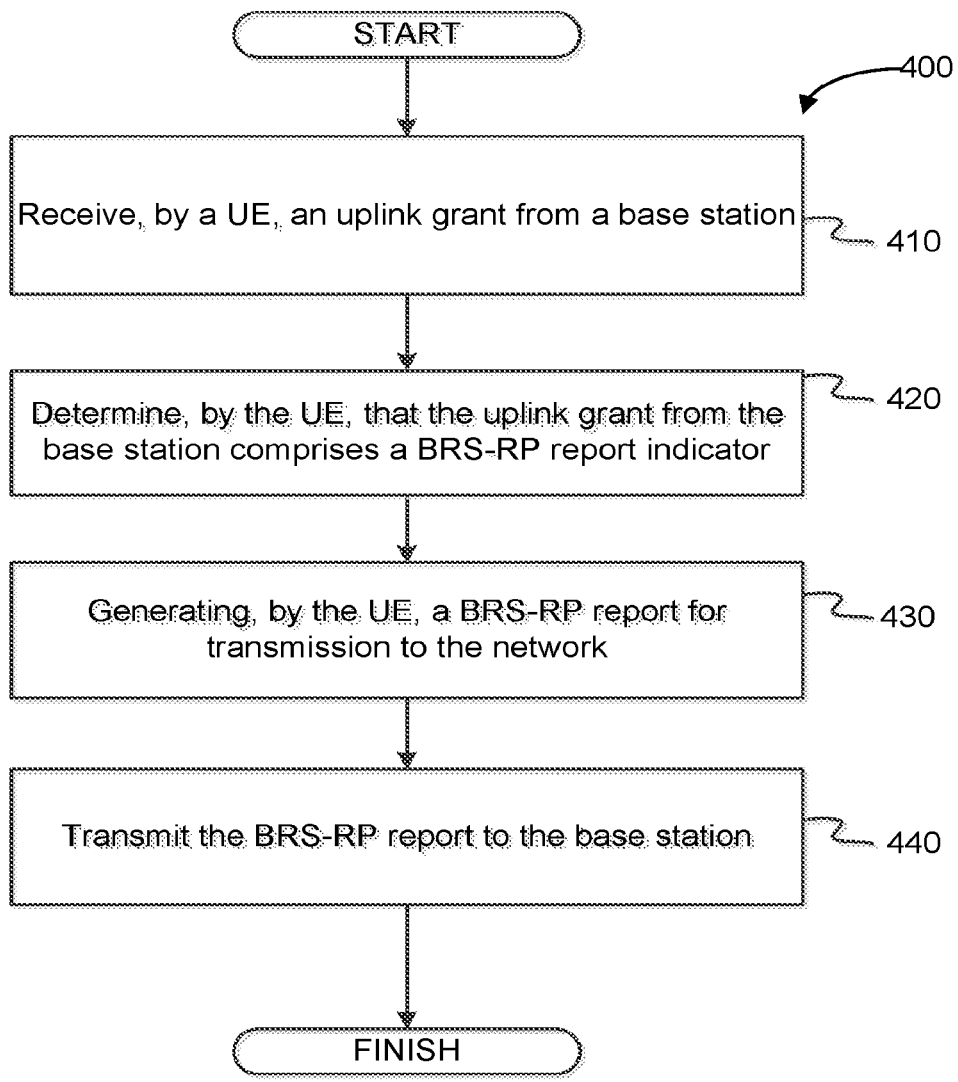
FIG. 4 illustrates a flowchart of an example method of performing channel quality reporting, according to an embodiment.

FIG. 4 is a flow chart 400 illustrating processes performed by a UE to report beam information to a network. Beginning in block 410, the UE receives an uplink grant message from an eNodeB. In some embodiments, the uplink grant may be received at the UE in a random access response over the physical downlink control channel (PDCCH). The UE may demodulate the response in order to process the uplink grant received in the PDCCH data. The uplink grant may be provided by the network so that the network can receive feedback information regarding the quality of communications received by the UE. The uplink grant may include scheduling information for the UE for providing feedback information. In some embodiments, the uplink grant may provide a scheduling trigger for sending one time beam information. For example, the uplink grant may include a control element that indicates to the UE to report feedback information for one or more CSI or beam information. In some embodiments, the uplink grant may provide for periodic reporting of beam information by the UE. For example, a control element in the uplink grant may indicate to the UE to report CSI or beam information at a scheduled time or frequency to the network.

In block 420, the UE determines that the uplink grant from the base station comprises a BRS-RP report indicator. The UE may determine how the uplink grant instructs the UE to transmit beam information. For example, the UE may determine what mode of reporting the UE should use as discussed above with reference to Table 1. The UE may also determine when and how to report BRS-RP information. For example, the UE may report the BRS-RP information on a xPUSCH in response to a scheduling trigger to send the information over the channel at a designated time. In some embodiments, the UE may instead send the BRS-RP information as a MAC CE as part of a MAC PDU. In some embodiments, the UE may report BRS-RP information to the network with associated CSI during CSI reporting. For example, the UE may determine that it is to report the BRS-RP on the same channel coding scheme as is used for CSI reporting.

In block 430, in response to determining that the uplink grant includes a BRS-RP indicator, the UE may generate a BRS-RP report. In order to generate the BRS-RP report, the UE may measure the signal strength of one or more beams received at the UE according to the instructions received from the network. In some embodiments, the UE may also use the signal strength in order to generate an index value for reporting to the network. For example, the UE may generate a beam index that indicates to the network which modulation and coding scheme to use for communications with the UE.

In block 440, the UE transmits the BRS-RP report to the base station. For example, the report may be transmit on xPUSCH as indicated by the uplink grant as a particular report, as a MAC CE, or associated with CSI. The baseband circuitry may cause the UE to transmit the BR-RP report by encoding the report in a message and sending the report through RF circuitry and front end circuitry to one or more antennas of the UE.

FIG. 5 illustrates a MAC CE that may be used by a UE to report beam information to an eNodeB. As discussed above, this is one embodiment of a way for a UE to report information to the eNodeB. The MAC CE illustrated in FIG. 5 is an example implementation. In various embodiments, the structure of a MAC CE for reporting beam information may be implemented differently, but with similar characteristics to the MAC CE illustrated in FIG. 5.

The MAC CE illustrated in FIG. 5 comprises 3 octets of data. The first information provided by the UE in the MAC CE may be a BRS index. The BRS index may provide the beam information to the eNodeB. The beam information may include an indication of which beam is measured by the UE. The next information provided in the MAC CE is the BRS-RP. The BRS-RP indicates the strength of the signal received by the UE for the measured beam. The SF value of the MAC CE may indicate the sub-frame index in which the BRS-RP is measured. The B value of the MAC CE may indicate the receiving beam flag. The receiving beam flag may indicate a flag that is provided be the received beam. The reserved bits are not used by the UE to convey information in the MAC CE. In some embodiments, a UE may send multiple MAC CEs as illustrated in FIG. 5 as part of a single MAC PDU. For example, the UE may measure the signal strength of more than one beam for transmission to the network. The baseband circuitry may generate a single MAC PDU with a MAC CE for each of the measured beams. The MAC CEs may then be transmit as a single MAC PDU be the UE.

Figure 6:
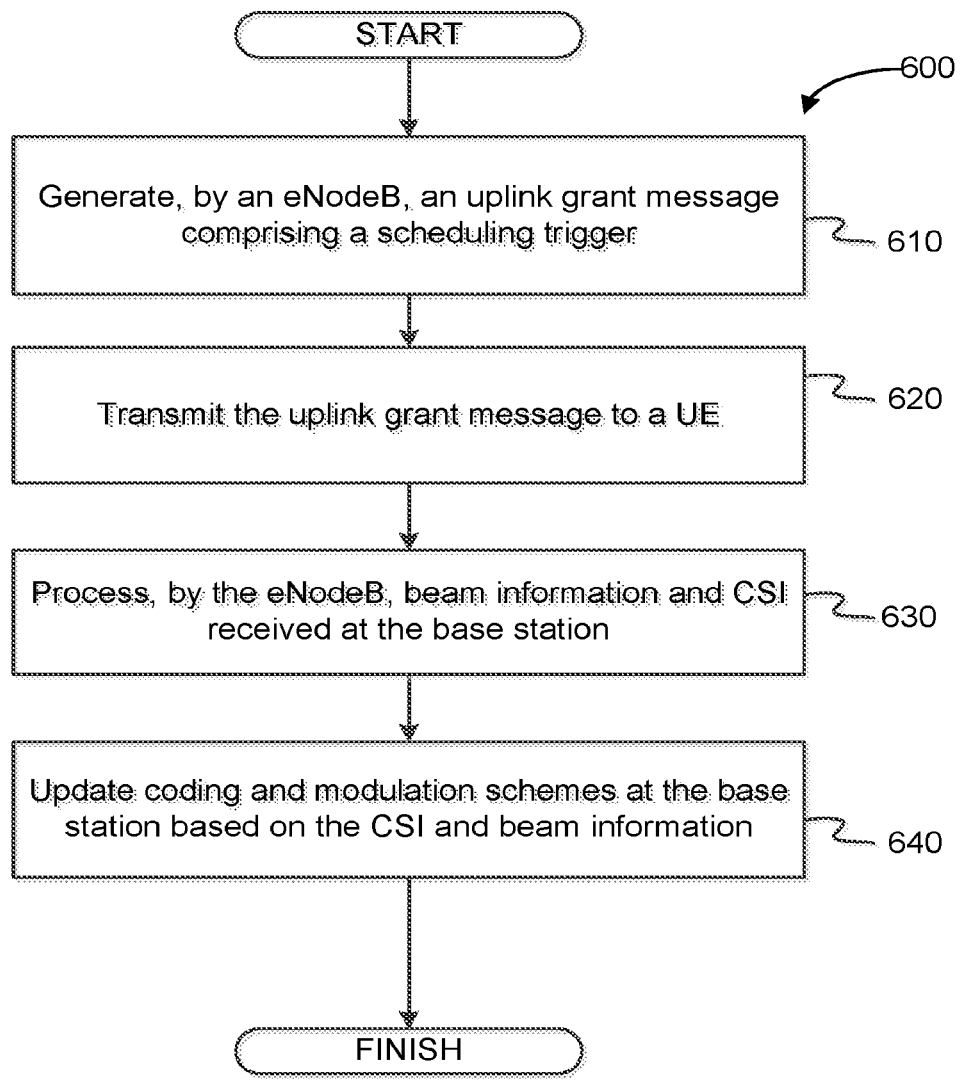
FIG. 6 illustrates a flowchart of an example method of performing channel quality reporting, according to an embodiment.

FIG. 6 is a flow chart 600 illustrating processes performed by an eNodeB to request beam information from a UE. Beginning in block 610, the eNodeB generates an uplink grant message comprising a scheduling trigger for a UE. The uplink grant request may include information indicating to the UE one or more beams or channels to measure and send feedback information to the eNodeB.

In block 620, the eNodeB transmits the uplink grant message to the LYE. For example, the uplink grant message may be sent as a radio resource control (RRC) message or a MAC signal to the UE. The uplink grant message may include scheduling information for the UE. Upon receiving the uplink grant message, the UE may generate a feedback report to the eNodeB based on the instructions. The eNodeB may receive the feedback information in block 630. For example, the eNodeB may receive information regarding beam information and CSI. Baseband circuitry of the eNodeB may process the received feedback information to determine BRS-RP, CSI, CQI, RI, BI or other information provided by the UE.

In block 640, the eNodeB may update the coding and modulation schemes at the base station based on the CSI and beam information. For example, if the UE reports an increasing strength of the BRS-RP, the eNodeB may increase the speed of transmission to the UE. On the other hand, if the UE reports decreasing signal strength, the eNodeB may decrease the modulation and code rate used to transmit data to the UE. In addition to changing the modulation and code scheme used for transmission to the eNodeB, the eNodeB may update other parameters to improve performance of the eNodeB or the UE. For example, the eNodeB may determine that it is to use a different beam for transmissions to the UE.

While the present disclosure describes a number of embodiments, those skilled in the art will appreciate numerous modifications and variations therefrom. It is intended that the appended claims cover all such modifications and variations as fall within the true spirit and scope of this present disclosure.

The following examples pertain to further embodiments of the disclosure.

Example 1 is an apparatus of a user equipment comprising: a memory device; and a processing device operatively coupled to the memory device, the processing device to: process a scheduling trigger indicating to provide channel state information (CSI) and beam information using extra-large physical uplink shared channel (xPUSCH); generate a reporting message comprising the CSI and the beam information: and cause the reporting message to be transmitted to a network over the xPUSCH.

In Example 2, in the apparatus of example 1, or any of the Examples described herein, the scheduling trigger comprises a beam reference signal receiving power (BRS-RP) report indicator, and wherein the processing device is to include the BRS-RP in the reporting message in response to the BRS-RP report indicator.

In Example 3, in the apparatus of example 1, or any of the Examples described herein, to generate a reporting message, the processing device is to include the beam information as a first media access control (MAC) control element, wherein the MAC control element comprises one or more of a beam reference signal index, a BRS-RP, a sub-frame index, or a beam flag.

In Example 4, in the apparatus of example 1, or any of the Examples described herein, the processing device is to report a second MAC control element for a second beam information of a second beam in one MAC protocol data unit with the first MAC control element.

In Example 5, in the apparatus of example 1, or any of the Examples described herein, the processing device is further to report a BRS-RP and CSI over the xPUSCH using a single channel coding scheme.

In Example 6, in the apparatus of example 1, or any of the Examples described herein, the processing device is further to generate the reporting message to include CSI and beam information according to a mode that is indicated by the scheduling trigger.

In Example 7, in the apparatus of example 1, or any of the Examples described herein, the processing device is further to report a first CSI for a first beam and a second CSI for a second beam.

In Example 8, the apparatus of example 1, or any of the Examples described herein, further comprises: radio frequency circuitry coupled to the processing device; and front-end circuitry coupled to the radio frequency circuitry, wherein the front-end circuitry is to transmit the reporting message through one or more antennas coupled to the front-end circuitry.

Example 9 is one or more computer-readable media having instructions that, when executed, cause a processing device of a user equipment (UE) to: process a scheduling trigger received at the UE in an uplink grant from an eNodeB, the scheduling trigger indicating to provide channel state information and beam information; determine that the uplink grant from the base station comprises a beam reference signal receiving power (BRS-RP) report indicator; generate a BRS-RP report for transmission to the network; and cause the UE to transmit the BRS-RP report to the eNodeB over a extra-large physical uplink shared channel (xPUSCH).

In Example 10, in the one or more non-transitory computer-readable media of Example 9 or any of the other examples described herein, to generate the BRS-RP report the instructions further cause the processing device to generate a first media access control (MAC) control element comprising measured BRS-RP.

In Example 11, in the one or more non-transitory computer-readable media of Example 9 or any of the other examples described herein, the instructions further cause the processing device to report a second MAC control element for a second BRS-RP of a second beam in one MAC protocol data unit with the first MAC control element.

In Example 12, in the one or more non-transitory computer-readable media of Example 9 or any of the other Examples described herein, the instructions further cause the processing device to report a second BRS-RP for a second measured beam.

In Example 13, in the one or more non-transitory computer-readable media of Example 9 or any of the other Examples described herein, the instructions further cause the processing device to determine a single channel coding scheme for reporting the BRS-RP and additional channel state information based on the uplink grant received from the eNodeB.

In Example 14, in the one or more non-transitory computer-readable media of Example 9 or any of the other Examples described herein, the instructions are further to cause the processing device to: to generate a CSI report to the network for a first beam associated with the BRS-RP; and include the BRS-RP report in a CSI message to be transmit to the network.

In Example 15, in the one or more non-transitory computer-readable media of Example 9 or any of the other Examples described herein, the instructions further cause the processing device to generate a message comprising the BRS-RP report according to a mode that is indicated by the scheduling trigger in the uplink grant.

Example 16 is an apparatus of a user equipment comprising: means for processing a scheduling trigger indicating to provide beam information to an eNodeB, wherein the scheduling trigger indicates to the apparatus to provide the beam information over an extra-large physical uplink shared channel (xPUSCH); means for generating a reporting message comprising beam information; and means for causing the reporting message to be transmit to the network over the xPUSCH.

In Example 17, the apparatus of Example 16, or any of the Examples described herein, further comprises means for measuring a signal strength of a beam indicated by the scheduling trigger, and means for determining a beam reference signal receiving power (BRS-RP) based at least in part on the measured signal strength of the beam indicated by the scheduling trigger, wherein the beam information comprises the BRS-RP.

In Example 18, the apparatus of Example 16, or any of the Examples described herein, further comprises means for generating a media access control (MAC) control element indicating the BRS-RP.

In Example 19, the apparatus of Example 16, or any of the Examples described herein, further comprises means for transmitting the beam information and CSI information at a single channel coding scheme.

In Example 20, in the apparatus of Example 16, or any of the Examples described herein, the means for generating the reporting message is to generate the message to include one or more of a precoding matrix indicator, channel quality indicator, rank index, or beam index, according to a mode received in an uplink grant, a MAC control element, or a radio resource control (RRC) message.

In Example 21, the apparatus of Example 16, or any of the Examples described herein, further comprises means for generating a second reporting message comprising second beam information for a second beam; and means for transmitting the reporting message and the second reporting message to an eNodeB.

Example 22 is an apparatus of a base station comprising: a memory device; and a processing device operatively coupled to the memory device, the processing device to: generate an uplink grant message comprising a scheduling trigger, wherein the scheduling trigger indicates to a user equipment (UE) to provide channel state information (CSI) and beam information using extra-large physical uplink shared channel (xPUSCH); process beam information and CST received at the base station; and updating coding and modulation schemes for the base station based at least in part on the CSI and beam information.

In Example 23, the apparatus of Example 22, or any of the Examples described herein, further comprises a first antenna and a second antenna to transmit messages to the UE, wherein the first antenna and the second antenna are to generate a plurality of transmission beams.

In Example 24, in the apparatus of Example 22, or any of the Examples described herein, the processing device is further to provide a mode in the scheduling trigger to indicate to the UE to include one or more of a precoding matrix indicator, channel quality indicator, rank index, or beam index.

In Example 25, in the apparatus of Example 22, or any of the Examples described herein, the mode provided by the processing device further indicates to the UE to provide first beam information for a first beam and second beam information of a second beam.

Example 26 is a method comprising: processing a scheduling trigger to provide beam information to an eNodeB, wherein the scheduling trigger indicates to the apparatus to provide the beam information over an extra-large physical uplink shared channel (xPUSCH); generating a reporting message comprising beam information; and causing the reporting message to be transmit to the network over the xPUSCH.

In Example 27, the method of Example 26, or any of the Examples herein, further comprises: measuring a signal strength of a beam indicated by the scheduling trigger: and determining a beam reference signal receiving power (BRS-RP) based at least in part on the measured signal strength of the beam indicated by the scheduling trigger, wherein the beam information comprises the BRS-RP.

In Example 28, the method of Example 26, or any of the Examples herein, further comprises generating a media access control (MAC) control element indicating the BRS-RP.

In Example 29, the method of Example 26, or any of the Examples herein, further comprises transmitting the beam information and CSI information at a single channel coding scheme.

In Example 30, in the method of Example 26, or any of the Examples herein, generating the reporting message comprises generating the message to include one or more of a precoding matrix indicator, channel quality indicator, rank index, or beam index, according to a mode received in an uplink grant, a MAC control element, or a radio resource control (RRC) message.

In Example 31, the method of Example 26, or any of the Examples herein, further comprises: generating a second reporting message comprising second beam information for a second beam; and transmitting the reporting message and the second reporting message to an eNodeB.

Example 32 is an apparatus comprising means to perform a method as described in any of Examples 26 to 31.

Example 33 is a machine-readable storage including machine-instructions that, when executed, cause an apparatus to perform a method as described in any of Examples 26 to 31.

Example 34 is a method comprising: generating, by one or more processors of a base station, an uplink grant message comprising a scheduling trigger, wherein the scheduling trigger indicates to a user equipment (UE) to provide channel state information (CSI) and beam information using extra-large physical uplink shared channel (xPUSCH); processing, by the processors, beam information and CSI received at the base station; and updating, by the processors, coding and modulation schemes for the base station based at least in part on the CSI and beam information.

In Example 35, the method of Example 34, or any of the Examples herein, further comprises transmitting, using a first antenna and a second antenna, the uplink grant message to the UE.

In Example 36, the method of Example 34, or any of the Examples herein, further comprises providing a mode in the scheduling trigger to indicate to the UE to include one or more of a precoding matrix indicator, channel quality indicator, rank index, or beam index.

In Example 37, the method of Example 34, or any of the Examples herein, further comprises providing a mode provided in the scheduling trigger to indicate to the UE to provide first beam information for a first beam and second beam information of a second beam.

Example 38 is an apparatus comprising means to perform a method as described in any of Examples 32 to 37.

Example 39 is a machine-readable storage including machine-instructions that, when executed, cause an apparatus to perform a method as described in any of Examples 32 to 37.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks. Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" on "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving." "determining." "issuing," "linking," "associating." "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first." "second." "third." "fourth," etc. as used herein are meant as labels to distinguish among different elements and may not necessarily have an ordinal meaning according to their numerical designation.

What is claimed is:

1. A method, comprising:
a user equipment (UE),
processing a scheduling trigger, wherein the scheduling trigger indicates that the UE is to provide channel state information (CSI) and beam information using extra-large physical uplink shared channel (xPUSCH); and
encoding xPUSCH data that includes a reporting message that comprises the CSI and a medium access control (MAC) control element (CE), wherein the MAC CE includes the beam information and a beam reference signal receiving power (BRS-RP) report.

2. The method of claim 1,
wherein the BRS-RP report includes channel quality information.

3. The method of claim 1,
wherein the scheduling trigger comprises a BRS-RP report indicator.

4. The method of claim 1,
wherein the MAC CE further includes at least one of a beam reference signal index, a subframe index, or a beam flag.

5. The method of claim 1, further comprising:
the UE,
reporting an additional MAC CE with second beam information of a second beam in one MAC protocol data unit along with the MAC CE.

6. The method of claim 1, further comprising:
the UE,
reporting the BRS-RP and the CSI over the xPUSCH using a single channel coding scheme.

7. The method of claim 1, further comprising:
the UE,
generating the reporting message to include the CSI and the beam information according to a mode that is indicated by the scheduling trigger.

8. The method of claim 1, further comprising:
the UE,
reporting a first CSI for a first beam and a second CSI for a second beam.

9. A user equipment (UE), comprising:
at least one antenna;
at least one radio in communication with the antenna; and
at least one processor in communication with the at least one radio and configured to cause the UE to:
process a scheduling trigger, wherein the scheduling trigger indicates that the UE is to provide channel state information (CSI) and beam information using extra-large physical uplink shared channel (xPUSCH); and
encode xPUSCH data that includes a reporting message that comprises the CSI and a medium access control (MAC) control element (CE), wherein the MAC CE includes the beam information and a beam reference signal receiving power (BRS-RP) report.

10. The UE of claim 9,
wherein the BRS-RP report includes channel quality information.

11. The UE of claim 9,
wherein the at least one processor is further configured to cause the UE to report another MAC CE for a second BRS-RP of a second beam in one MAC protocol data unit along with the MAC CE.

12. The UE of claim 9,
wherein the scheduling trigger comprises a BRS-RP report indicator.

13. The UE of claim 9,
wherein the MAC CE further includes at least one of a beam reference signal index, a subframe index, or a beam flag.

14. The UE of claim 9,
wherein the at least one processor is further configured to cause the UE to generate the reporting message to include the CSI and the beam information according to a mode that is indicated by the scheduling trigger.

15. The UE of claim 9,
wherein the at least one processor is further configured to cause the UE to report a first CSI for a first beam and a second CSI for a second beam.

16. A method, comprising:
a base station,
generating an uplink grant message comprising a scheduling trigger that indicates to a user equipment (UE) to provide channel state information (CSI) and beam information using extra-large physical uplink shared channel (xPUSCH); and
decoding xPUSCH data including the CSI and a media access control (MAC) control element (CE), wherein the MAC CE includes the beam information and a beam reference signal receiving power (BRS-RP) report.

17. The method of claim 16, further comprising:
the base station,
updating coding and modulation schemes stored in a memory of the base station based at least in part on the CSI and the beam information.

18. The method of claim 16,
wherein the BRS-RP report includes channel quality information.

19. The method of claim 16, wherein the scheduling trigger comprises a BRS-RP report indicator.

20. The method of claim 16, wherein the MAC CE further includes at least one of a beam reference signal index, a subframe index, or a beam flag.

* * * * *